(12) United States Patent
Seifert et al.

(10) Patent No.: US 8,684,144 B2
(45) Date of Patent: Apr. 1, 2014

(54) SHAFT BRAKE DISC, IN PARTICULAR FOR A RAIL VEHICLE

(75) Inventors: Peter Seifert, Dietersheim (DE); Matthias Niessner, Ismaning (DE); Rudolf Lutz, Maisach/Gernlinden (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 197 days.

(21) Appl. No.: 13/054,649

(22) PCT Filed: Jul. 13, 2009

(86) PCT No.: PCT/EP2009/005067
§ 371 (c)(1),
(2), (4) Date: Jan. 28, 2011

(87) PCT Pub. No.: WO2010/006748
PCT Pub. Date: Jan. 21, 2010

(65) Prior Publication Data
US 2011/0120820 A1    May 26, 2011

(30) Foreign Application Priority Data

Jul. 18, 2008 (DE) .......................... 10 2008 033 742

(51) Int. Cl.
*F16D 65/12* (2006.01)

(52) U.S. Cl.
USPC ................................. 188/18 A; 188/218 XL

(58) Field of Classification Search
CPC .... F16D 65/121; F16D 65/123; F16D 65/124
USPC ....... 188/26, 17, 18 R, 18 A, 218 R, 218 XL; 301/6.7, 6.8
See application file for complete search history.

(56) References Cited

U.S. PATENT DOCUMENTS

| | | | |
|---|---|---|---|
| 3,542,166 A * | 11/1970 | Harrison | 188/218 XL |
| 4,281,745 A * | 8/1981 | Wirth | 188/218 XL |
| 6,994,189 B2 * | 2/2006 | Chen | 188/26 |
| 2004/0182654 A1 | 9/2004 | Chen | |
| 2006/0081425 A1 * | 4/2006 | Chen | 188/218 XL |
| 2007/0193838 A1 | 8/2007 | Inagaki et al. | |

FOREIGN PATENT DOCUMENTS

| | | |
|---|---|---|
| DE | 2 201 885 | 8/1973 |
| DE | 37 18 770 | 12/1988 |
| DE | 38 14 614 | 11/1989 |

(Continued)

OTHER PUBLICATIONS

Notification Concerning Transmittal of International Preliminary Report on Patentability and Written Opinion of the International Search Authority for International Patent Application No. PCT/EP2009/005067, dated Jul. 13, 2009.

(Continued)

*Primary Examiner* — Thomas J Williams
(74) *Attorney, Agent, or Firm* — Barnes & Thornburg LLP

(57) ABSTRACT

A shaft brake disc, in particular for a rail vehicle, including a friction ring fastened to a hub by way of screws that are passed through a clamp ring at the inner periphery of the friction ring that sits against support flanges, the clamp ring forming a backing support for the screws, is adapted so that the clamp ring and the hub engage one another in a form-fitted manner.

8 Claims, 3 Drawing Sheets

(56) References Cited

FOREIGN PATENT DOCUMENTS

| | | |
|---|---|---|
| DE | 103 24 816 | 1/2004 |
| EP | 0 065 312 | 11/1982 |
| EP | 235382 A1 * | 9/1987 |
| EP | 0 293 868 | 7/1988 |
| EP | 1 548 317 A1 | 6/2005 |
| JP | 55-149632 U | 10/1980 |

OTHER PUBLICATIONS

International Search Report for International Application No. PCT/EP2009/005067, dated Sep. 16, 2009.

* cited by examiner

SHAFT BRAKE DISC, IN PARTICULAR FOR A RAIL VEHICLE

Disclosed embodiments relate to a shaft brake disk, in particular for a rail vehicle.

BACKGROUND

Such a shaft brake disk is disclosed by DE 38 14 614 A1. Connecting flanges, which are arranged on the inner circumference of the friction ring and extend radially inwards, and through which bolts, engaging in the hub, are guided, are provided for fastening the friction ring to a hub or shaft of a rail vehicle.

Here the clamping ring, through which the bolts are guided and supported thereon by their head or comparable parts, is intended, among other things, to prevent the bolts being subjected to bending stresses in the event of a shift in the position of the connected parts.

Special locking elements, which on the one hand are held in the hub and which on the other engage in the friction ring, afford protection against torsion. These locking elements serve to transmit the braking torque as well as a prevailing friction grip between the connecting flanges of the friction ring and the hub.

The clamping ring on the other hand is not suited to the transmission of braking torques, since the bolts are guided with a certain degree of play both through the clamping ring and through the connecting flanges.

This means that in the event of a thermally induced expansion of the friction ring by the clamping ring no adequate centering of the clamping ring is ensured, resulting in additional bending stresses of the bolts.

Besides these functional disadvantages, an unfavorable cost structure also ensues in the manufacture of the shaft brake disk, in particular due to the locking elements which have to be manufactured as special parts.

SUMMARY

Accordingly, disclosed embodiments provide a shaft brake disk of the generic type that improves its working reliability and service life and to allow more cost-effective manufacturing.

BRIEF DESCRIPTION OF THE FIGURES

An exemplary embodiment of the invention will be described below with reference to the drawings attached, of which.

DETAILED DESCRIPTION

In accordance with disclosed embodiments, the positive interlocking of the clamping ring and the hub serve reliably to center the clamping ring even if the friction ring, due to a thermally induced radial expansion, is incapable of affording radial support for the clamping ring.

In this case the clamping ring is held by the hub, in which positively interlocking parts, preferably formed onto the clamping ring, engage, for example in the form of prongs, which engage in end-face slots of the hub.

Here at least three prongs and corresponding slots are provided, which are in each case oriented radially in relation to the central axis.

The resulting torsionally fixed connection of the clamping ring to the hub also allows braking torques to be transmitted to the hub through a frictional bearing contact of the clamping ring against the friction ring.

Besides the purely functional advantages described, another particular distinguishing feature of the invention is its implementation in terms of production engineering, since it is possible to dispense with use of the hitherto necessary locking elements described in the state of the art, which previously served to create some protection against torsion between the hub and the friction ring.

Since they have to fit precisely, these locking elements can be manufactured only at a corresponding cost, which can now be eliminated.

The centering of the clamping ring that is ensured in any operating state avoids additional bending stresses of the bolts, as could occur formerly.

Naturally this does not lead to a functional reliability of the shaft brake disk overall, but also to an increase in the service life, since the risk of a fatigue fracture of the bolts is now virtually excluded.

The positively interlocking elements, in particular said prongs engaging in slots of the hub, are preferably arranged at the same angular interval on the clamping ring, thereby affording a uniform and hence optimal introduction of force.

Figure 1:
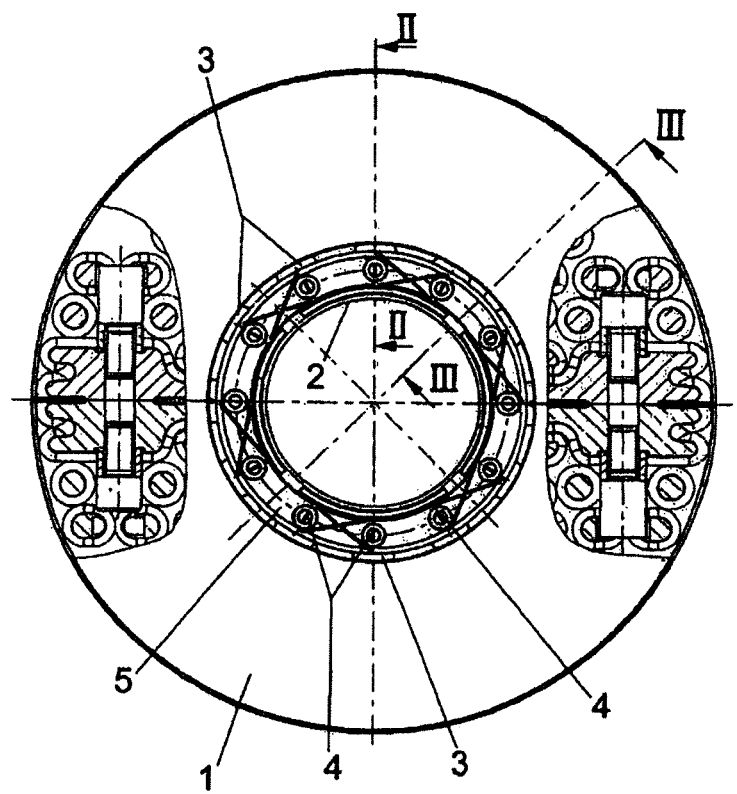
FIG. 1 shows a front view of a shaft brake disk according to the invention.
Figure 2:
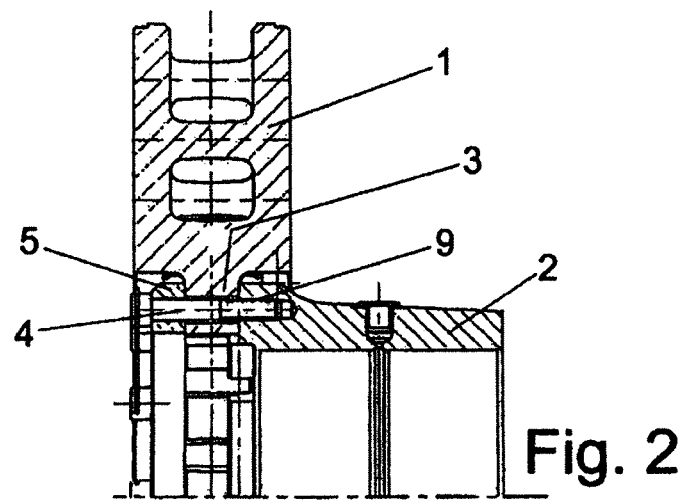
FIG. 2 shows a section through the shaft brake disk along the line II-II in FIG. 1
Figure 3:
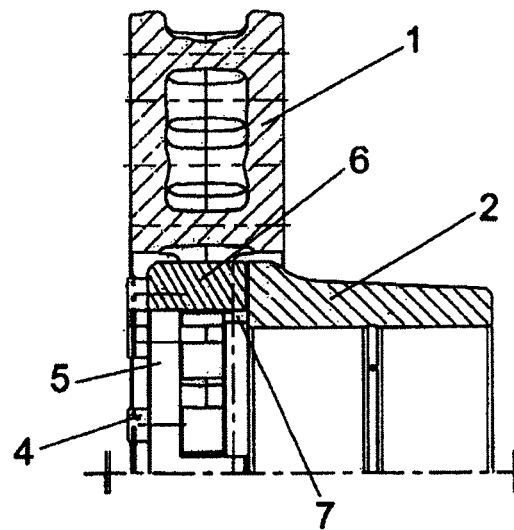
FIG. 3 shows a further section through the shaft brake disk along the line III-III in FIG. 1

FIG. 1 represents a shaft brake disk, which comprises a friction ring 1, which is connected by bolts 4 to a hub 2.

Figure 4:
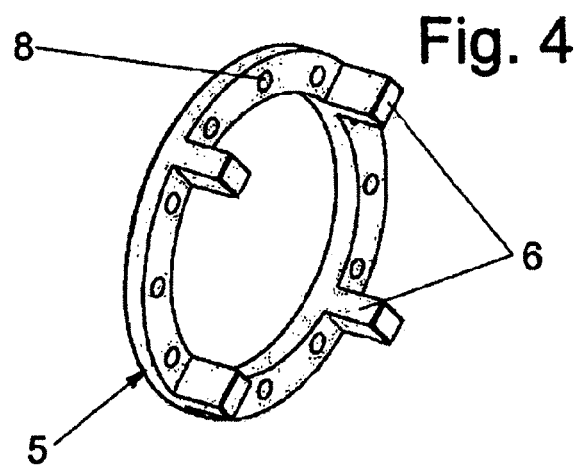
FIGS. 4 and 5 each show a perspective view of a component of the shaft brake disk.
Figure 5:
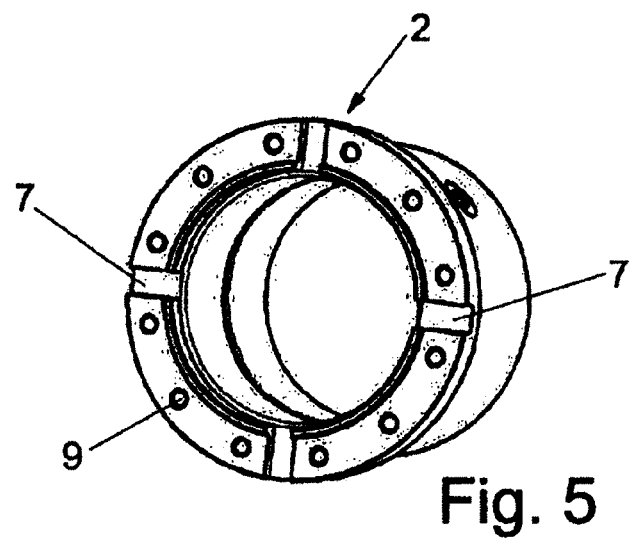

Here the bolts 4 are screwed into tapped holes 9 provided in the end face of the hub 2, whilst being guided by their shank through through-holes 10 in the friction ring 9 and through-holes 8 (FIG. 4) in a clamping ring 5, which bears on connecting flanges 3 of the friction ring 1 on the side facing the hub 2.

This clamping ring 5 forms an abutting support for the bolts 4, that is to say for their heads, and serves to press the friction ring 1 against the hub 2.

The connecting flanges 3 of the friction ring 1 are uniformly distributed over its inner circumference and extend radially inwards.

According to the invention the clamping ring 5 and the hub 2 interlock positively with one another. For this purpose the integrally formed clamping ring 5 in the present exemplary embodiment comprises four prongs 6, which, being preferably formed on, are each of block-shaped design and extend parallel to a central axis X. These prongs 6 arranged at the same angular interval from one another engage in matching slots 7, which are let into the end face of the hub 2, the hubs 7 adjoining the tapped holes 9.

In order to achieve a desired centering of the clamping ring 5 in any operating state, at least three prongs have to be provided, which for a uniform transmission of braking torque from the friction ring 1 to the hub 2 should also be arranged at the same angular interval from one another.

Other geometric shapes are obviously also feasible instead of the block-shaped prongs 6. The important thing is that a positive interlock is formed circumferentially and radially between the clamping ring 5 and the hub 2.

Here the prongs 6, as mentioned, may be formed onto the clamping ring 5, but it is also feasible, moreover, to connect these firmly to the clamping ring 5 as separate parts.

In principle, instead of the slots 7, the hub may naturally also be provided with prongs or projections of some other design, which engage in matching slots or similar depressions of the clamping ring 5.

The invention claimed is:

1. A shaft brake disk for a rail vehicle, the disk comprising:
a clamping ring; and
a friction ring including connecting flanges provided on an inner circumference of the friction ring, the friction ring being fastened to a hub by bolts, which are guided through the clamping ring,
wherein the clamping ring bears against the connecting flanges provided on the inner circumference of the friction ring to provide frictional bearing contact there between,
wherein the clamping ring provides an abutting support for the bolts,
wherein the clamping ring and the hub interlock positively with one another using a plurality of interlocking pairs of parts, a first part of the interlocking pair corresponding to the clamping ring and a second part of each interlocking pair corresponding to the hub, and
wherein braking torques are transmitted to the hub through the frictional bearing contact of the clamping ring against the friction ring,
wherein the interlocking pairs are distributed at a same angular interval from each other so as to provide a uniform transmission of braking torque from the friction ring to the hub, and
wherein the positive interlock between the clamping ring and the hub is formed circumferentially and radially so as to reliably center the clamping ring even if the friction ring, due to a thermally induced radial expansion, is incapable of affording radial support for the clamping ring, wherein a resulting torsionally fixed connection of the clamping ring to the hub transmits braking torques to the hub through a frictional bearing contact of the clamping ring against the friction ring,
wherein the positive interlock between the clamping ring and the hub protects against torsion between the hub and the friction ring without the use of hub locking elements configured to engage the hub and the friction ring, and
wherein the plurality of interlocking pairs of parts includes at least three pairs arranged at the same angular interval from one another to achieve centering of the clamping ring in any operating state and uniform transmission of braking torque from the friction ring to the hub through only the frictional bearing contact of the clamping ring against the friction ring.

2. The shaft brake disk of claim 1, wherein the first part corresponding to the clamping ring is provided on a side of the clamping ring that opposes a side of the hub on which the second part corresponding to the hub is provided and wherein, the first part is a projection and the second part is a depression.

3. The shaft brake disk of claim 2, wherein the projections are embodied as prongs, which engage in slots.

4. The shaft brake disk of claim 3, wherein the prongs are arranged on the clamping ring and the slots are arranged on the opposing end face of the hub.

5. The shaft brake disk of claim 3, wherein the prongs are of block-shaped design and extend parallel to a central axis.

6. The shaft brake disk of claim 3, wherein the prongs are guided through a space formed between two connecting flanges.

7. The shaft brake disk of claim 3, wherein the prongs are formed onto the clamping ring.

8. The shaft brake disk of claim 3, wherein the prongs are connected to the clamping ring as separate parts.

* * * * *